(12) United States Patent
Michaelis et al.

(10) Patent No.: US 8,094,556 B2
(45) Date of Patent: Jan. 10, 2012

(54) DYNAMIC BUFFERING AND SYNCHRONIZATION OF RELATED MEDIA STREAMS IN PACKET NETWORKS

(75) Inventors: Paul Roller Michaelis, Louisville, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 83 days.

(21) Appl. No.: 12/430,697

(22) Filed: Apr. 27, 2009

(65) Prior Publication Data
US 2010/0271944 A1    Oct. 28, 2010

(51) Int. Cl.
*H04J 3/06* (2006.01)
*H04L 1/00* (2006.01)

(52) U.S. Cl. .............. 370/230.1; 370/516; 370/412; 370/352

(58) Field of Classification Search .......... 370/516, 370/352–356, 395.64, 230.1, 252, 390, 231.1, 370/466, 412
See application file for complete search history.

(56) References Cited

U.S. PATENT DOCUMENTS

| | | |
|---|---|---|
| 5,035,252 A | 7/1991 | Mondre |
| 5,537,447 A | 7/1996 | Urbansky |
| 5,539,447 A | 7/1996 | Akuta et al. |
| 5,619,514 A | 4/1997 | Smith |
| 5,745,425 A | 4/1998 | Anderson et al. |
| 5,859,882 A | 1/1999 | Urbansky |
| 5,920,507 A | 7/1999 | Takeuchi et al. |
| 6,141,788 A | 10/2000 | Rosenberg et al. |
| 6,170,075 B1 | 1/2001 | Schuster et al. |
| 6,243,836 B1 | 6/2001 | Whalen |
| 6,260,071 B1 | 7/2001 | Armistead et al. |
| 6,381,645 B1 | 4/2002 | Sassin |
| 6,434,590 B1 | 8/2002 | Blelloch et al. |
| 6,434,606 B1 * | 8/2002 | Borella et al. ............. 709/214 |
| 6,452,950 B1 | 9/2002 | Ohlsson et al. |
| 6,650,637 B1 | 11/2003 | Bansal et al. |
| 6,690,675 B1 | 2/2004 | Kung et al. |
| 6,763,226 B1 | 7/2004 | McZeal, Jr. |
| 6,769,027 B1 | 7/2004 | Gebhardt et al. |
| 6,823,047 B1 | 11/2004 | Cruickshank |
| 6,845,129 B2 | 1/2005 | Golin |
| 6,862,298 B1 * | 3/2005 | Smith et al. ............. 370/516 |
| 6,879,582 B1 | 4/2005 | Dhara et al. |

(Continued)

FOREIGN PATENT DOCUMENTS
DE    10211740    10/2003
(Continued)

OTHER PUBLICATIONS

U.S. Appl. No. 12/361,950, filed Jan. 29, 2009, Michaelis, et al.
(Continued)

*Primary Examiner* — Kwang B Yao
*Assistant Examiner* — Candal Elpenord
(74) *Attorney, Agent, or Firm* — Sheridan Ross P.C.

(57) ABSTRACT

Mechanisms are disclosed for using two or more buffers, at a common receiving node, to reduce the effects of jitter, packet loss, and/or packet latency and/or synchronize different types of packets. Specifically, the two or more buffers can be used to temporarily store packets from different media streams that have a common timestamp and/or sequence number. Characteristics of the two or more buffers can then be independently controlled to accommodate the different media streams.

8 Claims, 2 Drawing Sheets

U.S. PATENT DOCUMENTS

| | | | |
|---|---|---|---|
| 6,914,964 B1 | 7/2005 | Levine | |
| 6,977,948 B1 | 12/2005 | Chennubhotla et al. | |
| 7,203,193 B2 | 4/2007 | Hoof | |
| 7,215,959 B2 | 5/2007 | Creamer et al. | |
| 7,293,176 B2 | 11/2007 | Otway et al. | |
| 7,352,766 B2 | 4/2008 | Van Asten et al. | |
| 7,359,979 B2 | 4/2008 | Gentle et al. | |
| 7,385,985 B2 | 6/2008 | Narsinh et al. | |
| 7,386,115 B2 | 6/2008 | Peters | |
| 7,418,002 B2 | 8/2008 | Robotham et al. | |
| 7,496,750 B2 | 2/2009 | Kumar et al. | |
| 7,606,928 B2* | 10/2009 | Wang et al. | 709/233 |
| 7,626,994 B2 | 12/2009 | Bennett | |
| 7,627,097 B2 | 12/2009 | Kawabata et al. | |
| 7,702,947 B2 | 4/2010 | Peddada | |
| 2001/0028634 A1 | 10/2001 | Huang et al. | |
| 2002/0073208 A1 | 6/2002 | Wilcock et al. | |
| 2002/0101853 A1 | 8/2002 | Siegrist et al. | |
| 2002/0150123 A1* | 10/2002 | Ro | 370/465 |
| 2003/0163328 A1 | 8/2003 | Rambo et al. | |
| 2003/0198218 A1 | 10/2003 | Farris et al. | |
| 2004/0057445 A1* | 3/2004 | LeBlanc | 370/412 |
| 2004/0076190 A1 | 4/2004 | Goel et al. | |
| 2004/0120309 A1* | 6/2004 | Kurittu et al. | 370/352 |
| 2004/0233898 A1 | 11/2004 | Otsuka et al. | |
| 2005/0074008 A1 | 4/2005 | Herledan et al. | |
| 2005/0094618 A1 | 5/2005 | Colban et al. | |
| 2005/0249146 A1 | 11/2005 | Pinault et al. | |
| 2006/0007915 A1 | 1/2006 | Frame | |
| 2006/0062371 A1 | 3/2006 | Vanderheiden et al. | |
| 2006/0083199 A1 | 4/2006 | Yang | |
| 2006/0126667 A1* | 6/2006 | Smith et al. | 370/486 |
| 2006/0140221 A1* | 6/2006 | Yamada et al. | 370/503 |
| 2006/0166716 A1 | 7/2006 | Seshadri et al. | |
| 2006/0203805 A1 | 9/2006 | Karacali-Akyamac et al. | |
| 2006/0233158 A1 | 10/2006 | Croak et al. | |
| 2006/0251051 A1 | 11/2006 | Bhatt et al. | |
| 2006/0256772 A1 | 11/2006 | Yarlagadda | |
| 2006/0277051 A1 | 12/2006 | Barriac et al. | |
| 2007/0026852 A1 | 2/2007 | Logan et al. | |
| 2007/0081460 A1 | 4/2007 | Karacali-Akyamac et al. | |
| 2007/0110034 A1 | 5/2007 | Bennett | |
| 2007/0147399 A1 | 6/2007 | Deng et al. | |
| 2007/0167156 A1 | 7/2007 | Hundal | |
| 2007/0177579 A1* | 8/2007 | Diethorn et al. | 370/352 |
| 2007/0183323 A1 | 8/2007 | Hannu et al. | |
| 2007/0211704 A1* | 9/2007 | Lin et al. | 370/356 |
| 2007/0223467 A1 | 9/2007 | Makiuchi et al. | |
| 2007/0280428 A1 | 12/2007 | McClelland | |
| 2007/0291733 A1 | 12/2007 | Doran et al. | |
| 2008/0002689 A1 | 1/2008 | Vera | |
| 2008/0013528 A1 | 1/2008 | Miller et al. | |
| 2008/0037567 A1 | 2/2008 | Cho et al. | |
| 2008/0165708 A1 | 7/2008 | Moore et al. | |
| 2008/0187108 A1 | 8/2008 | Engelke et al. | |
| 2008/0205377 A1 | 8/2008 | Chao et al. | |
| 2008/0232353 A1 | 9/2008 | Vafin et al. | |
| 2008/0232442 A1 | 9/2008 | Rodbro et al. | |
| 2008/0240004 A1 | 10/2008 | Shaffer et al. | |
| 2008/0285599 A1 | 11/2008 | Johansson et al. | |
| 2008/0298336 A1 | 12/2008 | Gollamudi | |
| 2008/0298349 A1 | 12/2008 | Beightol et al. | |
| 2008/0310398 A1* | 12/2008 | Jain et al. | 370/352 |
| 2009/0074012 A1* | 3/2009 | Shaffer et al. | 370/516 |
| 2009/0213837 A1 | 8/2009 | Ku et al. | |
| 2009/0234940 A1* | 9/2009 | Pal et al. | 709/224 |
| 2009/0235329 A1 | 9/2009 | Chavez et al. | |
| 2010/0165857 A1 | 7/2010 | Meylan et al. | |

FOREIGN PATENT DOCUMENTS

| | | |
|---|---|---|
| DE | 102006027708 | 2/2008 |
| EP | 0152251 | 8/1985 |
| EP | 1168714 | 1/2002 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007131296 | 11/2007 |

OTHER PUBLICATIONS

Wikipedia; Jitter—From Wikipedia, the free encyclopedia; printed from http://en.wikipedia.org/wiki/Jitter on Mar. 10, 2009; 6 pages.

Webopedia; What is jitter buffer?—A Word Definition for the Webopedia Computer Dictionary; printed from http://www.webopedia.com/TERM/J/jitter_buffer.html on Mar. 10, 2009; 6 pages.

Calvin Azuri, VoIP Services for SMB & Residential, http://74.125.95.104/search?q=cache:JqCKutpPN7gJ:voipservices.tmcnet.com/feature/article, Nov. 16, 2007, USA.

U.S. Appl. No. 12/406,784, filed Mar. 18, 2009, Michaelis, et al.
U.S. Appl. No. 12/486,605, filed Jun. 17, 2009, Michaelis, et al.
U.S. Appl. No. 12/426,023, filed Apr. 17, 2009, Michaelis, et al.
U.S. Appl. No. 12/433,334, filed Apr. 30, 2009, Brinkmann, et al.
U.S. Appl. No. 12/548,271, filed Aug. 26, 2009, Michaelis, et al.
U.S. Appl. No. 12/371,065, filed Feb. 13, 2009, Michaelis, et al.

Counterpath Corporation; "Network Convergence Gateway (NCG)", Internet Article printed on Nov. 25, 2008 from http://www.counterpath.com/network-convergence-gateway-ncg.html; 2 pages.

Gurock, et al., "Selecting the Right License Strategy for your Software", printed on Jul. 25, 2009, from the Internet at http://blog.gurock.com/articles/selecting-the-right-license-strategy-for-your-software, 6 pages.

"Indepth: Jitter", VoIP Troubleshooter website, available at http://www.voiptroubleshooter.com/indepth/jittersources.html, accessed on Oct. 22, 2009, pp. 1-8.

Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.

Wikipedia; "Network switching subsystem"; Internet Article printed on Feb. 6, 2009 from http://en.wikipedia.org/wiki/Home_Location_Register; 10 pages.

Wikipedia; "Subscriber Identity Module"; Internet Article printed on Feb. 6, 2009 from http://en.wikipedia.org/wiki/Subscriber_Identity_Module; 8 pages.

Wikipedia "H.323", http://en.wikipedia.org/w/index.php?title=H.323&printable=yes, Dec. 18, 2008, 14 pages.

Wikipedia "RTP Control Protocol"; http://en.wikipedia.org/w/index.php?title=RTP_Control_Protocol&pr... Jan. 9, 2009, 3 pages.

Wikipedia "Voice over Internet Protocol"; http://en.wikipedia.org/wiki/Voice_over_Internet_Protocol Jan. 23, 2009, 15 pages.

Wikipedia "H.245"; http://en.wikipedia.org/wiki/H.245 Nov. 9, 2009, 1 page.

Hahn N: "Dialog Via Internet Call Center" Nachrichtentechnik Elektronik, Veb Verlag Technik. Berlin, DE, vol. 48, No. 4, Jul. 1, 1998 pp. 17-19, XP000784128, ISSN: 0323-4657.

Background for the above captioned application (previously provided).

Official Action with English translation for German Patent Application No. 102010018376.8, issued Sep. 21, 2011 16 pages.

\* cited by examiner

DYNAMIC BUFFERING AND SYNCHRONIZATION OF RELATED MEDIA STREAMS IN PACKET NETWORKS

CROSS REFERENCE TO RELATED APPLICATION

Cross reference is made to U.S. patent application Ser. No. 12/361,950, filed Jan. 29, 2009 entitled "System and Method for Providing a Replacement Packet", which is incorporated herein by this reference in its entirety.

FIELD

The invention relates generally to control of buffers and particularly to control of jitter buffers in packetized communications.

BACKGROUND

Packet-switched telecommunications networks feature traffic, such as voice, video, and/or text, which is split or subdivided into pieces called packets. Packet communications use statistical multiplexing or dynamic bandwidth allocation where a physical communication channel is divided into a number of variable bit rate channels or streams. On the destination end, these packets are re-assembled based on their packet numbers and other statistical factors.

Packet-switched traffic is subject to Quality of Service ("QoS") issues, such as delay, jitter, dropped packets, out-of-order delivery, and/or packet corruption errors. For example, in a typical Voice over Internet Protocol ("VoIP") system a first person's voice stream is digitized, compressed, and subdivided into packets of encoded binary data by a first gateway. The packets are sent over a Virtual Private Network ("VPN") or an unregulated or public network, which delivers them to a far-end gateway with varying amounts of delay on each packet. The far-end gateway re-orders the received packets, then uncompresses (or synonymously decodes) the encoded binary data and thus provides a continuous audio stream to a second person. The audio stream is a slightly delayed copy of the first person's audio stream. In the example, the QoS is lowered by distortions introduced by, for example, the total delay from the speech event to aural reception, drop outs and other artifacts due to packets arriving too early (due to differential transit path length) or too late (such as due to network congestion and/or differential path length) to be correctly included in the audio stream, outright packet loss, buffer overflow, and other factors. The QoS problems are worsened for a multimedia conference where one must insure isochronous (equally timed) delivery of different types of traffic, such as voice and video.

A number of techniques have been developed to control the various factors impacting adversely the QoS. These techniques include jitter buffers, the ReSerVation Protocol ("RSVP"), the Differential Services (DiffServ) protocol, redundant transmission (such as specified in RFC-2198), scheduling algorithms (such as Weighted Fair Queuing ("WFQ")), class-based queuing, congestion avoidance mechanisms (such as Random Early Detection ("RED") and Weighted Random Early Detection ("WRED")), and the like.

A jitter buffer is a hardware device or software process that reduces jitter caused by transmission delays. As the jitter buffer receives packets, it writes them into memory in order of arrival. Packets are read out in proper sequence at the earliest possible time; that is, the packets are re-sequenced when out of order and are re-timed based on the local clock controlling the read pointer. The maximum net jitter that can be countered by a de-jitter buffer is equal to the buffering delay introduced before starting the play-out of the media stream. Without a jitter buffer to smooth the transmission, data can be lost, resulting, in the case of voice signals, in a perceivably choppy audio stream.

Jitter buffer size can be important to the listener-perceived quality of the audio stream. A large buffer, while permitting fewer packets to be lost, can introduce a large delay into the outputted audio stream. By contrast, a small jitter buffer, while introducing a smaller delay into the outputted audio stream, can cause significant packet loss. Call quality degrades when the network jitter exceeds the size of the jitter buffer. Accordingly, a jitter buffer of medium capacity or a jitter buffer of variable capacity is typically employed.

Although single buffers are common, prior art dual buffers have been employed in voice communications. In one implementation, a port network employed dual buffers of static capacities to effect dynamic bandwidth allocation. One buffer corresponded to Time Division Multiplexed ("TDM") data (which was not timestamped) and the other to packet data. The TDM data was assumed to be implicitly synchronized, always in order, and was taken in preferentially to packet data. Thus, the TDM data was not reordered due to jitter or latency. Each buffer had read and write pointers to maintain buffer state. A pop pointer allows resequencing of packets that arrived out of order. A controller selected TDM data preferentially when the next sequential memory location possessed such TDM data. Whenever the TDM buffer was unoccupied, the packet data buffer was read from, as needed, to provide data for selected memory locations having no TDM data.

Notwithstanding these techniques, QoS issues at the far-end gateway remain a problem.

SUMMARY

These and other needs are addressed by the various embodiments and configurations of the present invention. The present invention is directed generally to the use of two or more buffers to manage, more efficiently and effectively, packet jitter, latency, loss, and/or synchronization.

In a first embodiment, a method is provided that includes the steps:

(a) receiving, at a receiving node, first and second packets, the first and second packets having common packet durations and common timestamps and/or sequence numbers;

(b) writing, by a processor, the first packet to a first buffer;

(c) writing, by a processor, the second packet to a second buffer; and (d) selecting, by a control module, at least one of (i) a time to read each of the first and second packets from the first and second buffers, respectively, and (ii) which of the first and second packets to read, wherein, in (ii), only one of the first and second packets is used to fill a gap in a data stream.

In a second embodiment, a method is provided that includes the steps:

(a) maintaining, at a receiving node, at least first and second buffers for first and second sets of packets, wherein a selected first member of the first set of packets has at least one of a timestamp and sequence number in common with a selected second member of the second set of packets;

(b) resizing, by a control module and while at least one of the first and second buffers is occupied, the at least one of the first and second buffers, said resizing being a function of at least one of a state of a network over which at least some of the members of the first and/or second sets of packets are transmitted, a time to process members of the first and/or second sets of packets, relative occupancies of the first and second buffers, user requirements, and application requirements.

In one configuration, a point-of-convergence simultaneously accepts multiple Realtime Transmission Protocol ("RTP") streams that have traveled to that destination via differing routes. For each of the packet streams, the point-of-convergence has a separate buffer space. The point-of-convergence has a control mechanism that examines the header information of the packets, notably the time stamps and media descriptors, preferentially selects the better quality packet when packet types with the same timestamp contain the same basic information but possess differing quality (e.g., G.711 versus G.729 audio), uses the packets' timestamps to synchronize or coordinate the presentation of media when packet types represent a different media (such as G.711 audio and H.264 video or G.711 audio and RFC-4103 text), and preferentially, based on media stream type, makes intelligent tradeoffs between QoS and isosynchronicity.

In one configuration, multiple separate memory arrays with control logic or one memory array with control logic allow dynamic partitions within the array. By way of example, the array could have write pointers for writing the media streams into memory, read pointers for reading the media streams out, and a "pop" pointer capable of re-sequencing out-of-order packets. The control logic examines the packet number, the media type, and other statistical information and sources the packets to other Digital Signal Processor ("DSP") circuitry, such as downstream codecs, downstream packet loss concealment algorithms, and the like. The circuitry and the memory array could be combined physically in a programmable logic array, such as a Field Programmable Gate Array ("FGPA"), a microcontroller with memory, custom silicon, or could be made of off-the-shelf logic and memory devices. It could implement the control in hardware, software, or, most likely, a combination of both.

The memory array can act as jitter-buffers and optimize actions taken on multiple streams in regard to QoS and isosynchronicity. Those media streams can be identical information coded differently and sent over different networks with the intent of recovering one perfect or near perfect group of packets for a single information stream. Alternatively, those media streams could be multiple streams, such as voice and video, needing to be synchronized to avoid time offset. Another variation could be multiple media streams needing coordination, such as voice and text. By using associated control logic, intelligent decisions can be made with regard to quality and synchronization. This is in comparison to conventional systems in which trade offs are frequently made at different points in the network and improving QoS may negatively impact synchronization.

The present invention can provide a number of advantages depending on the particular configuration. The invention can control to acceptable levels, or eliminate entirely, isosynchronicity problems and maintain a relatively high quality of experience for the end user. It can maintain a relatively high Quality of Service ("QoS") over packet switched networks, particularly for VoIP communications. It can improve both the quality and reliability of media transmission using multiple transmissions of identically coded or alternately coded media streams, each of which could be used to sufficiently reconstruct a transmitted media stream. It can improve the qualities of multiple, packet-based, media streams, and/or synchronize them for simultaneous, or at least coordinated, delivery. It can improve, or eliminate, jitter, incorrect packet sequencing, and restore synchronization of multiple, packet-based, media streams and can optimize substantially either based on the media in question.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Average packet offset" is a moving average of the offset in time between (1) the temporal position assigned to an arriving packet in the buffer and (2) the front of the buffer (the packet which is currently serially being output).

"Average packet variance" is a parameter that measures the variation in packet delay, or jitter. The average packet variance is commonly a moving average of the variance of packet arrival time.

A "buffer" is a routine or storage used to compensate for a difference in a rate of flow of data or time of occurrence of events, when transferring data from one device (the input device) to another device (the output device). A jitter buffer is a specialized type of buffer that compensates or removes jitter.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "jitter" is an undesirable timing variation of a transmitted digital signal.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

A "pointer" is an identifier, such as a data element, indicating the location of another data element. The value of the pointer, or pointer value, is commonly a memory address of the located data element.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
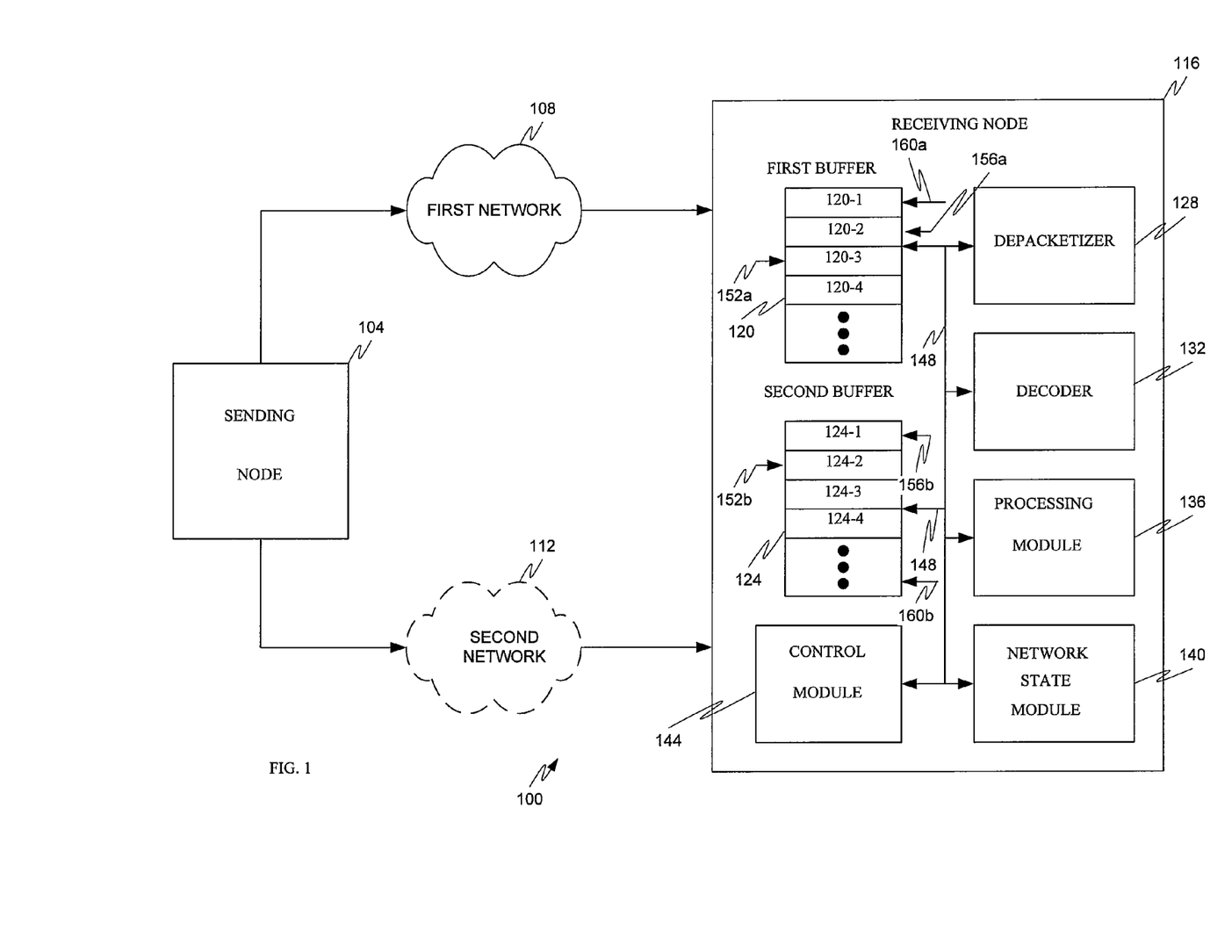
FIG. 1 is a block diagram of a system according to a first embodiment.

Referring to FIG. 1, a first embodiment of the invention will be described.

The system 100 includes a sending node 104 in communication, via first and (optional) second networks 108 and 112 respectively, with a receiving node 116. The receiving node 116 includes a number of components, including first and second buffers 120 and 124 respectively, depacketizer 128, decoder 132, processing module 136, network state module 140, and control module 144, all in communication by way of a bus 148. As will be appreciated, in a full duplexed communication session both of the nodes will be sending and receiving packets and, therefore, both will have these components.

The sending and receiving nodes 104 and 116 can be a variety of communication devices. Exemplary communication devices include Voice over Internet Protocol ("VoIP") devices (such as IP softphones and hardphones), switches, media servers, routers, session border controllers, and gateways (e.g., security and port gateways). Commonly, the communication is software-controlled and includes a general purpose microprocessor; however, a specialized Digital Signal Processor ("DSP") can be used.

The first and second networks 108 and 112 are commonly both packet-switched; however, one or both of the networks may be circuit-switched. In one configuration, different packet communication pathways in only the first network 108 are used. In another configuration, different signal communication communication pathways over both of the first and second networks 108 and 112 are employed.

The first and second buffers 120 and 124 have a number of slots, or addressed memory locations, 120-1, 120-2, 120-3, 120-4, . . . and 124-1, 124-2, 124-3, 124-4 . . . to receive, store, and properly sequence (by timestamp and/or packet number) data, commonly voice or video data, for subsequent readout. The buffers 120 and 124 may be a hardware device or software process, depending on the configuration, with a software process being preferred. In one configuration, one or both of the first and second buffers 120 and 124 are dynamic and adaptive, having a variable capacity. The first and second buffers 120 and 124 are in a managed memory allocation, under the control of control module 144 (discussed below). The memory allocated can be any suitable type of recordable and readable medium. The buffers may use a partitioned common memory or separate memories, depending on the configuration. Another equivalent alternative would be a dedicated memory block or register under the control of the module 144.

For buffer management, a number of pointers are employed. Each of the first and second buffers 120 and 124 has a corresponding pair of read and write pointers 152$a,b$ and 156$a,b$, respectively. The read pointer points to a last-read packet, or portion thereof, while the write pointer points to a last-written or recorded packet, or portion thereof. Although the entire packet, including the packet header, trailer, and payload, is normally written into a buffer slot, an alternative configuration writes only selected parts of the packet into the slot. An example, would be the payload and, commonly, also the packet sequence number or time stamp. A read process (not shown) reads the slot contents while a write process (not shown) writes contents to each slot. In addition to the read and write pointers 152 and 156, pop pointers 160$a,b$ point to any out of sequence memory location that is needed to resequence out of order packets within the first and second buffers 120 and 124. A pop pointer can be thought of as either a non-sequential read pointer (in which the pointer points to the next out-of-order packet in a packet sequence) or, alternatively, a return-to-sequence read pointer (which points to the last ordered packet in a non-sequential ordering of packets). In the present invention, the pop pointer can be used either way.

The depacketizer 128 receives re-ordered packets from the one of the first and second buffers 120 and 124 currently pointed to by the read pointer 152$a,b$, and removes the packet header and trailer from the packet. If compressed, the payload is then passed to the decoder 132. In one configuration, the correspondingly timestamped and/or sequence numbered packet in the other buffer is removed from the buffer and discarded.

The decoder 132 decompresses the payload. The decoder can be any suitable decompression algorithm. As will be appreciated, compression can reduce the bandwidth or number of bits needed to encode information or a signal, typically by eliminating long strings of identical bits or bits that do not change in successive sampling intervals (e.g., video frames or silence). Any level of compression may be employed. Exemplary compression algorithms include MPEG-2 (video), MPEG-4 (video), H.264 (video), RFC-4103 (text), G.711 (audio), G.723.1 (audio), G.729 (audio), and the like.

The processing module 136 processes the decompressed payload for the desired application. For audio payloads, the module 136 reconverts the audio segments into an audio (speech) stream for a listener. The module 136 may perform digital-to-analog conversion or vice versa, depending on the configuration. The module 136 may also perform mask variations by psychoacoustically transparent or minimally intrusive filling (data augmenting) or decimation. To augment audio data, it is advantageous to selectively duplicate encoded packets corresponding to the silences between words and/or stable vowel sounds. Other similar techniques are also known in the art. For video payloads, the module 136 may also perform digital-to-analog conversion or vice versa, depending on the configuration. The module 136 may also be used to alter a characteristic of a video stream, such as interlacing, display resolution, aspect ratio, color space and bits per pixel, video quality, bit rate, and format.

The network state module 140 determines a state of the first and/or second network 108, 112 using a suitable technique. The network state may be quantified using a number of parameters, including access priority, bandwidth availability, jitter, packet loss, latency, toll quality, cell error ratio, severely errored cell block ratio, cell loss ratio, cell transfer delay, mean cell transfer delay, cell delay variability, average packet offset, average packet variance, or the like. Network state can be determined by passive techniques, such as observing the characteristics of arriving packets and/or the buffers, and by other active (intrusive or nonintrusive) techniques, such as using network probes and sending and receiving ping packets.

The control module 144 controls not only to which of the first and second buffers the pop pointer 160 points but also the capacity of each of the first and second buffers. As will be appreciated, buffer capacity can be expressed using any suitable metric, such as count of packets, time units (milliseconds), and the like.

In controlling the buffer selected by the read pointer 152*a, b*, the control module 144 includes which of the two buffers contains uncompressed or a lower level of compressed data (with the compressed or lower compressed buffer being preferred), whether or not a specific packet in the packet sequence has arrived in the preferred buffer (when a packet has not yet arrived and it is to be read out, the packet is read from the less preferred buffer), and the network state of the communication path used for transmitting packets to each buffer (with the communication path having a higher Quality of Service ("QoS") being preferred). In one configuration, the sending node 104 sends a selected video or audio frame using first and second levels of compression and the same timestamp or packet sequence number and source and destination address pairs over the first network 108. A first packet having the first level of compression is stored in the first buffer, and the second in the second buffer. The buffer having the lower level of compression is used preferentially as the packet source, with the other buffer being used for packets not in the preferred buffer. In another configuration, the first and second packets have the same level of compression (or no compression) and are sent over different networks or over the same networks but over differing communication pathways. The packets have the same source address and packet sequence number and/or timestamp. When an intermediate router receives both packets having the same source address and packet sequence number and/or timestamp, the router resends the packets along different paths (or via differing router interfaces). This is done by each router maintaining, in memory and over a selected time period, a listing of fields from previously encountered packet headers.

In either configuration, the packets, though commonly having payloads extracted over a common time interval (e.g., 20 milliseconds), may or may not have the same (duplicated) payload. For example, the first and second packets may have the same or different types of media payload (e.g., the same or differing media descriptors); that is, the first and second packets may have the same frame of audio data or commonly timestamped frames of audio and video data (which must by synchronized when presented to a user).

In one configuration in which the payload is duplicated, the sending node 104 is a VoIP device (hardphone or softphone) and the sending node 104 transmits the same set of information (either control signals and/or performance metrics in the case of the RealTime Control Protocol (RTCP) or audio information in the case of the RealTime Transfer Protocol (RTCP)) over a circuit-switched first network 108 (preferably over a cellular network) and packet-switched second network 112. The first set of packets sent over the first network 108 are compressed while a second set of packets sent over the second network 112 are not. The second buffer 124 (which contains the second set of packets) is the preferred buffer for the selected set of information while the first buffer 120 (which contains the first set of packets) is used when a given member of the set of information is absent, at the time of reading, from the second buffer 124.

In one configuration in which the payload is not duplicated, the sending node 104 receives both voice and video streams corresponding to a common set of occurrences (e.g., a multimedia telephone call, a multimedia recording or live filming or presentation and the like). Each audio frame has a corresponding video frame generated from a common event over the same time interval. The first set of packets contains payload from the audio stream while the second set of packets contains payload from the video stream. At the receiving node 116, the first and second buffers 120 and 124 are sized so that the time to read corresponding pairs of audio and video information substantially minimizes loss of a frame of information due to packet jitter or latency. This may cause the first and second buffers 120 and 124 to have differing capacities, which depends primarily on the relative states of the first and second networks 108 and 112. The need to synchronize the first and second sets of packets is more important than latency caused by delayed presentation to the user. Although this example is discussed with reference to audio and video, it is to be understood that it is equally applicable to any combination of text, video and/or audio.

In controlling the capacity of each of the buffers, the control module 144 considers a number of factors. These factors include, for example, network state of the network over which packets for a selected buffer are transmitted (a lower QoS will generally require a larger buffer size than a higher QoS), sizes of the packets to be stored in the selected buffer (payload having a higher level of compression requires less memory to be stored than payload having a lower level of compression), buffer occupancy of the selected buffer, packet processing latency introduced by the depacketizer 128, decoder 132 (certain compression algorithms, such as G.729, require more processing to decompress than others, such as G.711), and/or processing module 136 (video processing, in particular, may introduce significant delays in processing video packets requiring the audio packets to be held in the buffer longer), available (maximum) memory for the selected buffers, the maximum amount of latency that the processing module 136 can tolerate to meet user or application requirements (certain applications, such as VoIP require lower levels of latency than other applications, such as image processing), type of media used for the selected buffer's communication pathway (circuit-switched networks generally have lower latency and packet loss than packet-switched networks), whether the payload for commonly timestamped or numbered packets is duplicated by the first and second buffers (applications involving duplicated payloads generally can tolerate lower latency/jitter than non-duplicated payloads), whether the payload for commonly timestamped or numbered packets in the first and second buffers is different types of media or has different media descriptors (e.g., audio frame and a matching video frame), whether the payload is control signaling or bearer data (control signals, such as Dual Tone Multi-Frequency ("DTMF") signals need to be synchronized with the corresponding audio stream), nature of payload in the selected buffer (e.g., a VoIP conversation involving shorter and more frequent changes in speakers generally requires lower latency/jitter). As will be appreciated, the first and second buffers can be adjusted dynamically to have the same or different capacities.

Figure 2:
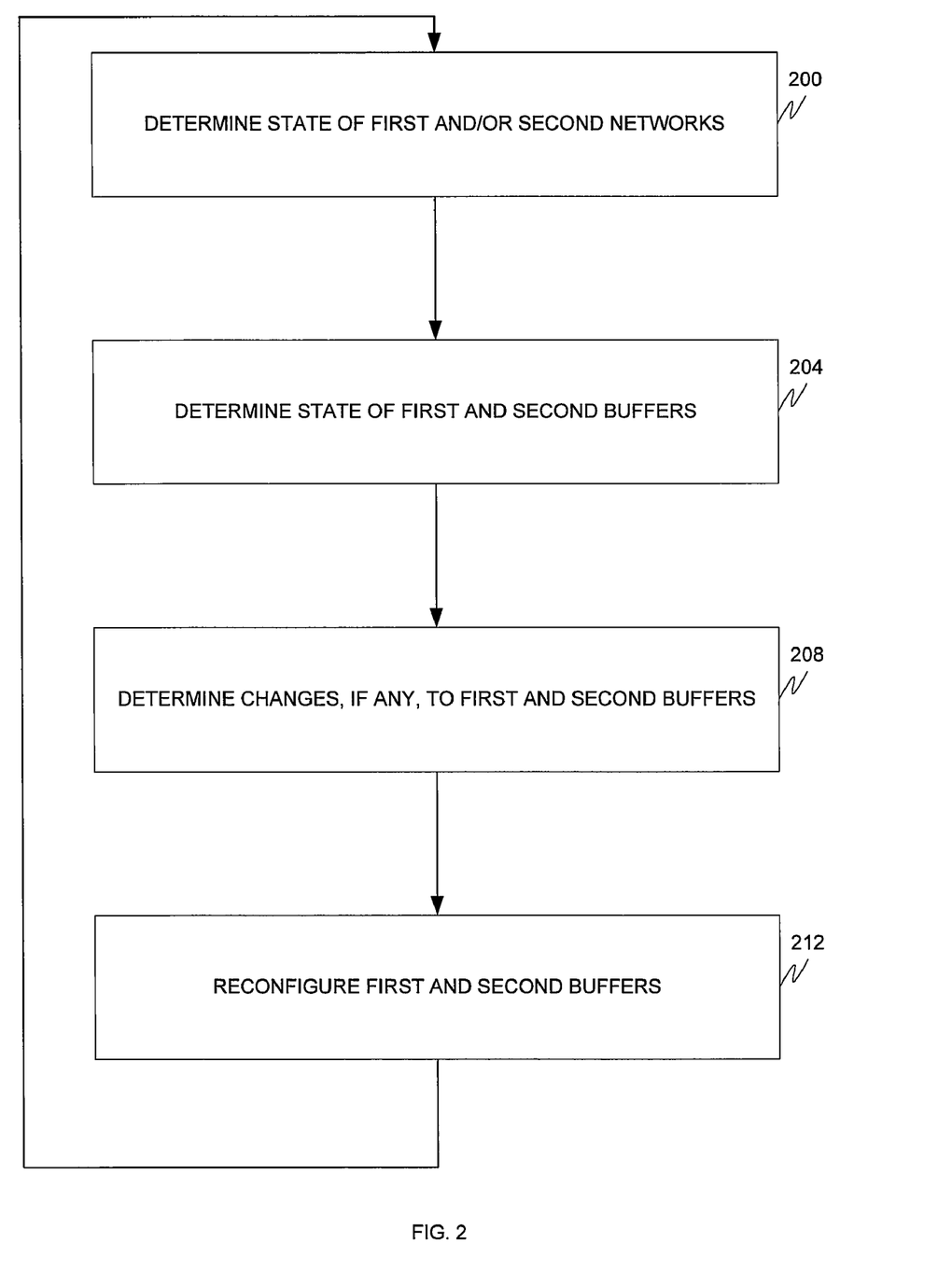
FIG. 2 is a flowchart according to the first embodiment.

The operation of the receiving node 116 will now be discussed with reference to FIG. 2.

In step 200, the network state module 140 determines a state of the first and/or second networks 200. In one configuration, the receiving node compares the current network state against the current value(s) for network state from the last network state determination. If one or more of the value(s) has not had at least a selected amount of change, the subsequent steps 204, 208, and 212 are not performed.

In step 204, the control module 144 determines a current state of the first and second buffers 120 and 124. The buffer state predominantly considers buffer capacity, positions of the read, write, and/or pop pointers, and numbers and/or locations of vacant slots 120-1, 120-2, 120-3, 120-4, 124-1, 124-2, 124-3, 124-4 . . . In one configuration, the control module 144 further determines a current state of one or more of the depacketizer 128, decoder 132, and/or processing module 136.

In step 208, the control module 144 receives the current network state from the network state module 140 and determines, based on rules and policies and the various current states, the requisite changes, if any, to the first and second buffers 120 and 124. As noted, the possible changes include the positions of the pop pointers 160a,b, read pointers 152a,b, and write pointers 156a,b, and the capacities of the first and second buffers 120 and 124.

In step 212, the control module 144 reconfigures the first and second buffers 120 and 124 as determined by step 208.

The exemplary systems and methods of this invention have been described in relation to a simplex network architecture. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a gateway or switch, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the dual buffering system is located downstream of the processing module the dual buffer architecture is located upstream or downstream of a resource-intensive processing module, such as an image or video processor, which introduces significant processing latency when compared to an audio processor. For example, upscaling to maximize resolution is resource intensive, and the digital signal processor can introduce math errors through oversampling in the absence of buffering. In this manner, packets of differing payload types can be synchronized successfully.

In another alternative embodiment, the dual buffering system can be used to maintain synchronization when an outage on a circuit-switched network, such as a Time Division Multiplexed ("TDM"), channel occurs and the communication system fails over to a packet-switched network.

In another alternative embodiment, the dual buffering system can be used to synchronize control signals with bearer packets.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
(a) receiving, at a common receiving node, first and second packets, the first and second packets having common packet durations as well as at least one of common timestamps and common sequence numbers, the first packet being received in a first media stream and the second packet being received in a second different media stream; (b) writing, by a processor, the first packet to a first buffer; (c) writing, by the processor, the second packet to a second buffer; and (d) selecting, by a control module, at least one of (i) a time to read each of the first and second packets from the first and second buffers, respectively, and (ii) which of the first and second packets to read, wherein, in (ii), only one of the first and second packets is used to fill a gap in a data stream; and wherein the first and second packets have common source and destination address pairs, wherein a payload of the first packet has a first level of compression, wherein a payload of the second packet has a second level of compression, wherein the first level of compression is less than the second level of compression, and wherein the payload types of the first and second packets are the same; and wherein the first packet is transmitted over a packet-switched network and the second packet is transmitted over a circuit-switched network, wherein (ii) is selected, wherein the first packet is read from a first queue corresponding to the first buffer and the second packet is not read from a second queue corresponding to the second buffer, and wherein the second packet is removed from the second queue at substantially the same time that the first packet is read from the first queue.

2. The method of claim 1, wherein (i) is selected, wherein the first and second packets have common source and destination address pairs, and wherein the first and second packets have different types of media payloads.

3. The method of claim 1, wherein (ii) is selected, wherein the first and second packets have common source and destination address pairs, wherein payloads of the first and second packets have differing levels of compression, and wherein the first and second packets have a common type of media payload.

4. A non-transitory computer readable medium encoded with instructions that, when executed, perform the steps of claim 1 and wherein the computer readable medium is in communication with the processor.

5. A system, comprising:
an input operable to receive first and second packets, the first and second packets having common packet durations and common timestamps and/or sequence numbers, the first packet being received in a first media stream, the second packet being received in a second different media stream;

a processor operable to write the first packet to a first buffer and write the second packet to a second buffer; and a control module operable to determine at least one of (i) a time to read each of the first and second packets from the first and second buffers, respectively, and (ii) which of the first and second packets to read, wherein, in (ii), only one of the first and second packets is used to fill a gap in a data stream; and wherein the first and second packets have common source and destination address pairs, wherein a payload of the first packet has a first level of compression, wherein a payload of the second packet has a second level of compression, wherein the first level of compression is less than the second level of compression, and wherein the payload types of the first and second packets are the same; and wherein the first packet is transmitted over a packet-switched network and the second packet is transmitted over a circuit-switched network, wherein (ii) is selected, wherein the first packet is read from the first buffer and the second packet is not read from the second buffer, and wherein the second packet is removed from the second buffer at substantially the same time that the first packet is read from the first buffer.

6. The system of claim 5, wherein (i) is selected, wherein the first and second packets have common source and destination address pairs and wherein the first and second packets have different types of media payloads.

7. The system of claim 5, wherein (ii) is selected, wherein the first and second packets have common source and destination address pairs, wherein payloads of the first and second packets have differing levels of compression, and wherein the first and second packets have a common type of media payload.

8. The system of claim 5, wherein the control module resizes, while at least one of the first and second buffers is occupied, the at least one of the first and second buffers, said resizing being a function of at least one of a state of a network over which the first and/or second packets are transmitted, a time to process the first and/or second packets, relative occupancies of the first and second buffers, time varying user requirements, and time varying application requirements.

* * * * *